United States Patent Office 3,009,327
Patented Nov. 21, 1961

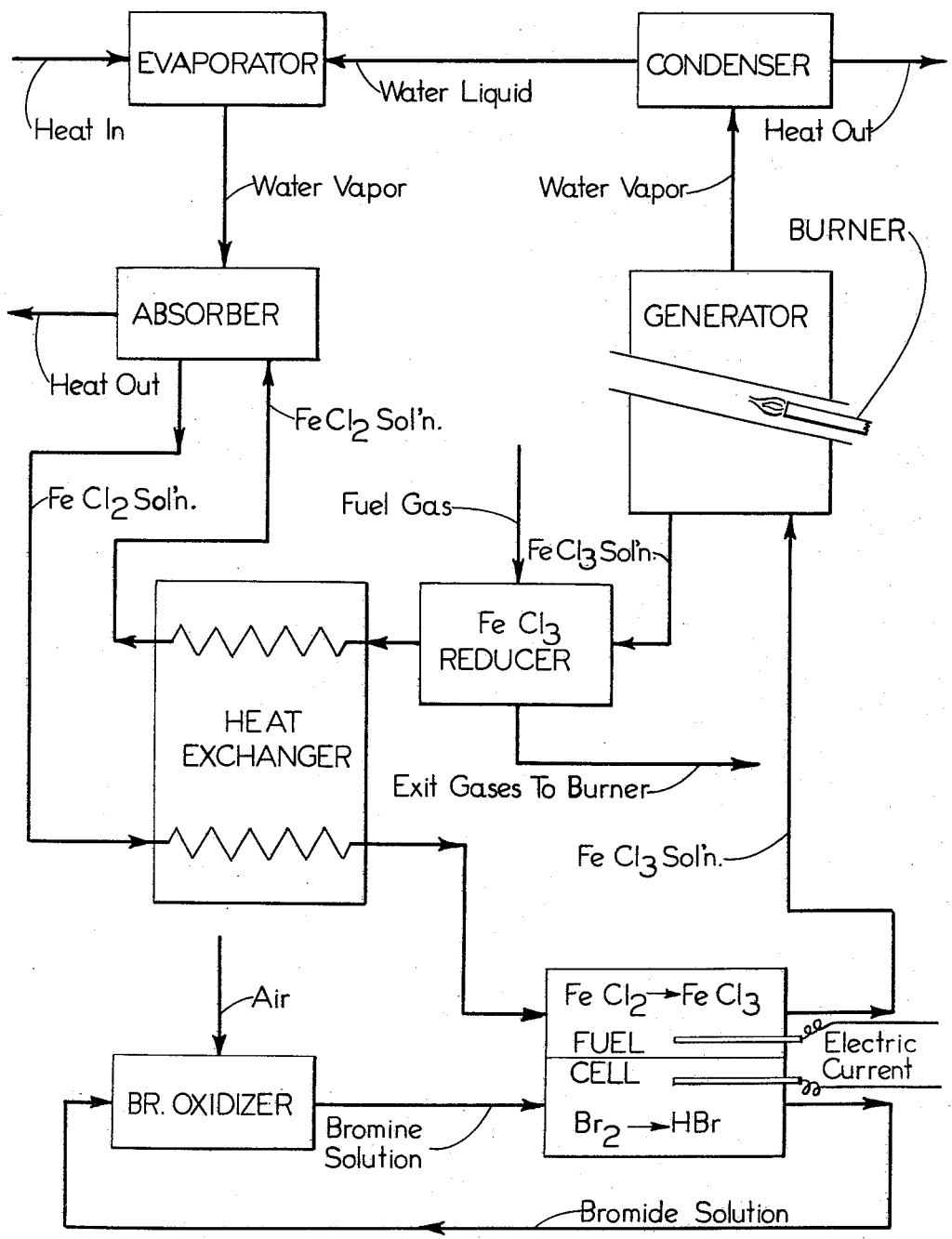

3,009,327
ABSORPTION COOLING CYCLE
Sanford A. Weil, Chicago, Ill., assignor to Institute of Gas Technology, Chicago, Ill., a corporation of Illinois
Filed Mar. 21, 1960, Ser. No. 16,230
8 Claims. (Cl. 62—4)

This invention relates to an improved absorption cooling system. Conventional absorption refrigeration systems of this type usually employ a gas flame as a source of energy, a salt solution as the source of refrigerant, and comprises four elements:

(1) A generator in which a salt solution is heated by the gas burner to produce water vapor,
(2) A condenser in which the water vapor is cooled to the liquid state,
(3) An evaporator which actually cools the air or liquid to be conditioned as the liquid water running through a coil is converted to the vapor state due to heat absorption from the media being conditioned, and
(4) An absorber in which the water vapor from the evaporator is reabsorbed by the salt solution which was concentrated in the generator.

The salt usually used in these systems is very hygroscopic and for convenience of handling, the cation has a single valence state, e.g. lithium bromide, calcium chloride.

The primary object of the present invention is to provide a system of this kind in whch the coefficient of performance (a measure of the efficiency) is significantly improved over the conventional system just mentioned. The ideal coefficient of performance may be calculated in accordance with the following equation:

$$C.O.P. = \frac{T_e(T_g - T_a)}{T_g(T_c - T_e)}$$

in which the terms represent the absolute temperatures of the evaporator $T_e$, the generator $T_g$, the absorber $T_a$ and the condenser $T_c$. Normally, the temperature of the evaporator is determined by the purpose of the cooling system. The temperatures of the condenser and absorber are limited by the means available for removing heat from these sections. The only other value affecting efficiency, $T_g$, cannot normally be modified because it, $T_g$, must be at that value necessary to achieve the desired water vapor pressure in the condenser. Now, if the nature of the salt solution can be changed so that the generator temperature must be higher to maintain the desired temperatures in the evaporator, absorber and condenser, it will appear from the foregoing equation that the coefficient of performance will be increased.

I have found that this objective can be obtained by employing a salt in the refrigerant solution having a cation that exists in two or more different valency states and converting the cation of the salt to a different state of oxidation as it passes from the generator to the absorber and back again. When the salt in the generator is different in oxidation state from that in the absorber, and that state which has the greater negative deviation from Raoult's law is in the generator, the generator temperature must be greater to maintain the remaining temperatures.

Of the two oxidation levels of the salt, the higher one usually yields the lower vapor pressure in aqueous solution. This is directly related to the usually greater degree of hydration of the higher oxidation state of the salt. Thus, $FeCl_3$ can have six waters of hydration whereas $FeCl_2$ can have four; $CuCl_2$ can have two waters of hydration whereas none are reported for $CuCl$; $SnCl_4$ can have five but $SnCl_2$ only two waters of hydration. In any case, since the salts are basically different, their solutions will have different vapor pressures at equivalent compositions, and the choice of the appropriate solution for the appropriate portion of the cooling cycle can readily be made from knowledge of the vapor pressure. As indicated, the solution having higher vapor pressure is used in the absorber while the solution having the lower vapor pressure is used in the generator.

Reference is now made to the drawing which is a schematic diagram of an absorption refrigeration cycle using, for purposes of illustration, the ferric-ferrous chloride system. All of the components of the apparatus are labeled, as are the flow paths of the various materials which pass through the several components. The generator, condenser, evaporator and absorber are of conventional construction commonly used in gas refrigerators and air conditions. In the conventional system a single salt solution is used in the generator and the absorber. In the present invention the salt solution in the generator, because it has the lower vapor pressure, is the ferric chloride solution and is intended to be maintained at a temperature of about 372° K. The gas burner in the generator causes the water of the solution to be vaporized and the water vapors pass into the condenser which reduces the temperature of the vapor sufficiently to convert it to the liquid state. The condenser may be of the water-cooled type or it may be air cooled. In this particular system, the refrigerant water is cooled to about 320° K. in the condenser. The liquid water discharged from the condenser passes into the evaporator where it absorbs heat from the surrounding media, whatever this may be. The evaporating water is at a temperature of about 283° K. The evaporator is interconnected with the absorber which contains the solution that absorbs the water vapor produced in the evaporator. The absorber is adapted to operate at a temperature of 293° K. The ratio of water to salt in the absorber is 7.3 on a molar basis. The ratio in the generator is 6.7.

The concentrated ferric chloride solution remaining after evaporation of the water vapor is transferred by suitable means from the generator to the absorber to pick up the water vapor and dilute the solution to its former concentration. In accordance with the present invention, however, the ferric chloride is reduced before being passed through the absorber. The reduction is carried out by passing fuel gas, which consists essentially of methane and ethane, through the solution to reduce the ferric chloride to ferrous chloride. The gas remaining after reduction is cycled back to the gas burner in the generator. The ferrous chloride solution is then passed through the absorber to pick up the water vapor. After this has been accomplished, the ferrous chloride solution is cycled back to the generator but before reaching the generator it is oxidized to the higher valency state. For this purpose I prefer to use a fuel cell of the redox type. These cells are well known in the art as being capable of converting chemical energy into electrical energy by taking advantage of the reactions that take place between ions that exist in two or more valency states. The cell has an electron acceptor and an electron donor disposed on either side of a semi-permeable membrane disposed within the cell. Platinum electrodes or the like also are disposed on either side of the membrane and as the reaction takes place between ions a current is caused to flow between the electrodes. In the form shown in the drawing the ferrous chloride (anolyte) is oxidized at the anode with the production of electrons which flow through the external circuit to do useful work. At the cathode the bromine solution (catholyte) is reduced to the bromide with the production of oxygen ions which will flow readily through the semi-permeable membrane disposed between the anode and electrode sections of the fuel cell. The electrodes may be made from porous carbon, from a porous metal taken from the platinum group, or of other porous metallic materials. The semipermeable membrane may be made from filter paper treated with silicone fluid. It should be understood that the present invention is not confined to a fuel cell of this particular construction since any of the constructions disclosed in the prior art which utilize the oxidation of a salt from its lower to its higher valency state with the production of electrons may be employed.

Although the amount of power produced in this manner is relatively low, it is produced at small additional cost since the oxidation step is required for the oxidation of the iron solution. The fuel cell described above is disclosed in a paper by A. M. Posner published in "Fuel," volume 34, pages 330–338, 1955. Other disclosures of fuel cell constructions which are suitable for use in connection with this invention may be found in a collection of papers presented before the American Chemical Society in September 1959 which have been published in a book entitled "Fuel Cells," Reinhold Publishing Corporation, 1960.

A heat exchanger has been shown in the oxidation-reduction system illustrated in the drawing. Although it is not necessary, its use is preferred because the efficiency of the fuel cell is greatly improved by operating at higher temperatures. Any suitable means for raising the temperature of the salt solution may be employed, preferably a gas burner.

In operating the system just described at the temperatures and concentrations indicated, and assuming that the activity coefficient of water in ferric chloride solution is 0.125 and that of water in ferrous chloride solution is 0.60, the calculated coefficient of performance is equal to 1.63. Using the same constants, the comparable coefficient of performance for a system utilizing ferric chloride solution in both the absorber and the generator is equal to 1.05 while the use of a ferrous chloride solution in both the absorber and the generator provides an ideal coefficient of performance equal to 0.92. Thus it will be appreciated that the ideal coefficient of performance of an absorption system of this type can be improved by a factor of over 50% through use of this invention. Although the numerical values may be different for other absorbant refrigerant systems, the qualitative effect of salt modification would be the same, that is, the salt modification method yields higher coefficients of performance than either of the two forms used alone under comparable conditions.

It will also be appreciated that means other than those shown in the example may be employed for effecting oxidation and reduction of the salt in the solution. Furthermore, salts other than iron chlorides may be used. For example, tin chlorides which are convertible from the stannous to the stannic states are suitable. Copper salts are likewise operable in the invention. In addition to being capable of being oxidized and reduced, the salt should be readily soluble in water so that a minimum quantity of water is required to operate the system. Salts which are not corrosive are preferred to corrosive salts since the latter require equipment which is more expensive in order to resist the corrosive effect of the salt.

In an alternative form of the invention the external portion of the redox fuel cell, that is, the bromide oxidation and reduction system, may be used as part of another cooling system similar to the iron chloride system. Of course, a different salt system must be used in the second cooling apparatus. Improved cooling efficiency may be obtained by operating two cooling systems of this type in series.

What I claim as new and desire to secure by Letters Patent of the United States is:

1. In an absorption cooling process which comprises generating water vapor from a salt solution in which the salt is capable of existing in at least two valency states, condensing the water vapor, evaporating the condensed vapor to effect cooling, and reabsorbing the water vapor into the salt solution, the steps of altering the valency state of the salt in the concentrated solution remaining after said generating step, passing the modified salt solution through an absorber, thereby diluting the solution by absorption of water vapor, converting the salt to its original valency state in the diluted solution and again generating water vapor from said diluted solution.

2. The method of claim 1 wherein said solution passing to and from said absorber is heated to accelerate the alteration of the valency state of the salt solution.

3. An absorption cooling process which comprises generating water vapor from a salt solution in which the salt is capable of existing in at least two valency states and which exists in its higher valency state in the generator, utilizing the water vapor to effect cooling, contacting said salt solution with a fuel gas to reduce the salt to its lower valency state, causing said water vapor to be reabsorbed by said reduced salt solution containing the reduced salt, oxidizing the salt in said solution to its original higher valency state and repeating said generating step.

4. The process of claim 3 in which the heat for generating the water is supplied by a gas burner.

5. An absorption cooling process which comprises generating water vapor from a salt solution in which the salt is capable of existing in at least two valency states and which exists in its higher valency state in the generator, utilizing the water vapor to effect cooling, reducing the salt in said solution to its lower valency state, causing said water vapor to be reabsorbed by said reduced salt solution, passing said solution through a redox fuel cell to oxidize the salt to its original higher valency state and simultaneously generate electric current, and repeating said generating step.

6. The process of claim 5 in which the salt solution is maintained at elevated temperature during the oxidation and reduction steps.

7. The process of claim 5 in which said salt is iron chloride.

8. An absorption cooling process which comprises generating water vapor from a salt solution in which the salt is capable of existing in at least two valency states to provide a relatively high vapor pressure for one valency state and a relatively low vapor pressure for the other valency state, said solution having the relatively low vapor pressure being present in the generator, utilizing the water vapor to effect cooling, converting the salt in said low vapor pressure solution to said one valency state having the relatively high vapor pressure, causing said water vapor to be reabsorbed by the salt solution having said relatively high vapor pressure, converting the salt in the latter solution to said other valency state and repeating said generating step.

References Cited in the file of this patent
UNITED STATES PATENTS

| | | |
|---|---|---|
| 567,959 | Borchers | Sept. 22, 1896 |
| 2,641,527 | Leutz | June 9, 1953 |

OTHER REFERENCES

Status Report on Fuel Cells, by B. R. Stein, June 1959.